United States Patent
Yu et al.

(10) Patent No.: US 8,141,889 B2
(45) Date of Patent: Mar. 27, 2012

(54) BUBBLE-GENERATING SCOOTER FOR CHILDREN

(75) Inventors: Suihuai Yu, YongKang (CN); Jinyun Huang, YongKang (CN)

(73) Assignee: Zhejiang Hongsheng Manufacturing Co., Ltd., Zhejiang (CN)

( * ) Notice: Subject to any disclaimer, the term of this patent is extended or adjusted under 35 U.S.C. 154(b) by 0 days.

(21) Appl. No.: 12/452,757

(22) PCT Filed: May 20, 2009

(86) PCT No.: PCT/CN2009/000553
§ 371 (c)(1),
(2), (4) Date: Jan. 21, 2010

(87) PCT Pub. No.: WO2010/072040
PCT Pub. Date: Jul. 1, 2010

(65) Prior Publication Data
US 2011/0233884 A1    Sep. 29, 2011

(30) Foreign Application Priority Data

Dec. 22, 2008  (CN) .................... 2008 2 0228378 U
Mar. 31, 2009  (CN) .................... 2009 2 0145733 U

(51) Int. Cl.
*B62M 1/00* (2010.01)
(52) U.S. Cl. ..................................... 280/87.041; 446/15
(58) Field of Classification Search .............. 446/15–21; 280/87.01–87.05
See application file for complete search history.

(56) References Cited

U.S. PATENT DOCUMENTS 6,953,376 B1 * 10/2005 Kim et al. ....................... 446/15

* cited by examiner

*Primary Examiner* — J. Allen Shriver, II
*Assistant Examiner* — Erez Gurari
(74) *Attorney, Agent, or Firm* — Nixon & Vanderhye P.C.

(57) ABSTRACT

This utility model relates to a bubble-generating scooter for children, comprising: a footrest assembly, a handle assembly and wheels, and further comprising a bubble-generating device mounted on the scooter. Connecting posts are provided to the housing of the bubble-generating device. The bubble-generating device is connected to the footrest carrier through the connecting posts and self-tapping screws. The bubble-generating scooter for children of this utility model can generate bubbles continuously when a child rides the scooter, thereby adding fun to the riding of this scooter.

6 Claims, 3 Drawing Sheets

BUBBLE-GENERATING SCOOTER FOR CHILDREN

This application is the U.S. national phase of International Application No. PCT/CN2009/000553 filed 20 May 2009, which designated the U.S., and claims priority to Chinese application No(s). 200820228378.7, filed 22 Dec. 2008 and 200920145733.9, filed 31 Mar. 2009, the entire contents of each of which are hereby incorporated by reference.

TECHNICAL FIELD

This utility model relates to a scooter, and particularly relates to a bubble-generating scooter for children mounted with a bubble-generating device.

BACKGROUND ART

A scooter is a popular sports product for today's youngsters and children. There are many kinds of scooters and their auxiliary entertainment functions are increasing. In order to meet the various entertainment needs of youngsters, a scooter with multiple entertainment functions needs to be developed.

The Content of Utility Model

The technical problem to be solved by this utility model is to provide a bubble-generating scooter for children so as to increase children's interest in scooters and enhance pleasure.

The technical solution adopted by this utility model is: a bubble-generating scooter for children, comprising: a footrest assembly, a handle assembly and wheels, and being characterized by further comprising a bubble-generating device mounted on the scooter.

Preferably, two of the wheels are provided at the rear portion of the scooter; a footrest carrier is provided between the two wheels; and the bubble-generating device is mounted on the footrest carrier.

Preferably, connecting posts are provided to the housing of the bubble-generating device. The bubble-generating device is connected to the footrest carrier through the connecting posts and self-tapping screws.

Preferably, the bubble-generating device comprises:

a liquid storage tank having a liquid inlet provided at the top thereof and a liquid outlet provided at the bottom thereof;

a bubble-ejecting barrel having an upper opening and a lower opening, with a liquid inlet port being provided at the top of the bubble-ejecting barrel, wherein a film-hanging needle which can rotate around the central axis of the bubble-ejecting barrel is provided at the center of the upper opening, the rotational shaft of the film-hanging needle being connected with a connecting pipe;

a blower whose vent port is connected with the lower opening of the bubble-ejecting barrel;

a transmission device having a plurality of output shafts;

a liquid transporting device for transporting liquids;

wherein the liquid inlet port of the bubble-ejecting barrel is connected with the liquid outlet port of the liquid storage tank through a hose passing through the liquid transporting device; and the liquid transporting device, the blower and the connecting pipe connected to the rotational shaft of the film-hanging needle are connected to each of the output shafts of the transmission device, respectively.

Preferably, an overflow opening is provided to the top of the bubble-ejecting barrel and is connected with the liquid inlet port of the liquid storage tank via an overflow hose.

Preferably, the transmission device includes a motor, a worm, a worm wheel, a first gear, a second gear, a first pinion, a second pinion, a first shaft, a second shaft and a third shaft;

wherein the worm is connected with an output shaft of the motor, and the worm wheel is meshed with the worm;

both the first pinion and the worm wheel are mounted on the first shaft, and the first gear and the first pinion are meshed with each other;

both the second pinion and the first gear are mounted on the second shaft; the second pinion and the second gear are meshed with each other; and the second gear is mounted on the third shaft;

the blower is connected to another output shaft of the motor; and the lower portion of the connecting pipe connected with the film-hanging needle is connected with the third shaft.

Preferably, the liquid transporting device includes a cylindrical barrel provided at the bottom of the lower housing of the transmission device, wherein two openings are provided at the symmetrical positions on the circumference of the barrel so that the hose connected between the liquid inlet port of the bubble-ejecting barrel and the liquid outlet port of the liquid storage tank passes through the two openings, thereby allowing a portion of the hose to be disposed inside the barrel. The second shaft, passing through the lower housing of the transmission device, is disposed in the center of the barrel. A rotational arm which rotates together with the second shaft is fixed to the end of the second shaft, wherein each of the two ends of the rotational arm is provided with a support shaft on which a rotational body is provided, and the rotational body periodically presses against the hose inside the barrel as the rotational arm rotates.

Compared with the prior arts, this utility model has the advantage of a simple structure with multiple functions. When a child rides the scooter, the bubble-generating device can generate bubbles continuously, thus improving the pleasure of the sport.

| Illustrations of the Reference Signs | |
|---|---|
| 1 footrest assembly | 2 handle assembly |
| 3 wheel | 11 bubble-generating device |
| 111 lower housing | 112 battery box |
| 113 battery box cover | 114 transmission device |
| 115 bubble-ejecting barrel | 116 liquid storage tank |
| 117 upper housing | 118 power switch |
| 119 connecting post | 120 hose |
| 121 overflow hose | 122 blower |
| 123 liquid inlet port | 124 liquid inlet opening |

-continued

| Illustrations of the Reference Signs | |
|---|---|
| 125 overflow opening | 126 liquid outlet opening |
| 127 liquid pump | 128 film-hanging needle |
| 129 connecting pipe | 200 barrel body |
| 201 opening | 202 shaft sleeve |
| 203 rotational arm | 204 rotational body |
| 300 motor | 301 worm |
| 302 worm wheel | 303 first gear |
| 304 second pinion | 305 second gear |
| 306 first pinion | 307 first shaft |
| 308 second shaft | 309 third shaft |

DETAILED DESCRIPTION OF EMBODIMENTS

Figure 1:
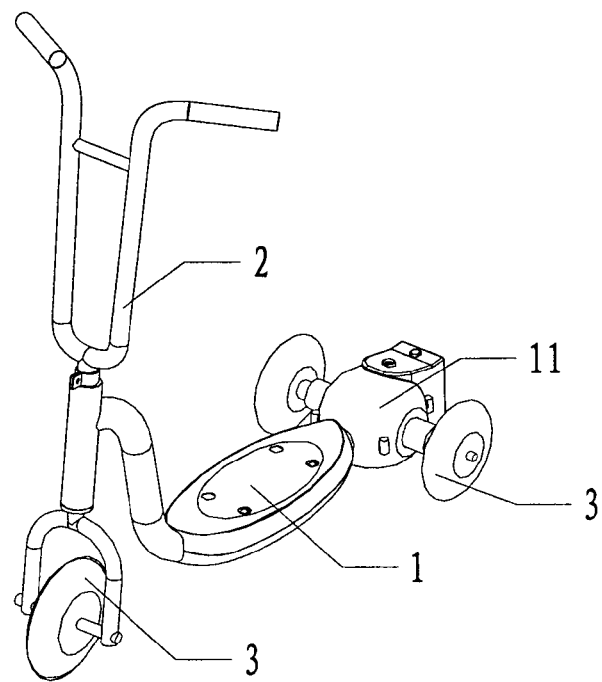
FIG. 1 is a drawing showing the overall structure of the bubble-generating scooter for children according to one embodiment of this utility model.

As shown in FIG. 1, the bubble-generating scooter for children according to one embodiment of this utility model comprises a footrest assembly 1, a handle assembly 2, three wheels 3 and a bubble-generating device 11, wherein two of the three wheels 3 are disposed at the rear side of the scooter; a footrest carrier is provided between the two wheels 3; and the bubble-generating device 11 is mounted on the footrest carrier. Of course, the bubble-generating device 11 may be mounted on other portions of the scooter so long as the bubble-generating device 11 is fixed. The scooter may be other kinds of scooters for children.

Figure 3:
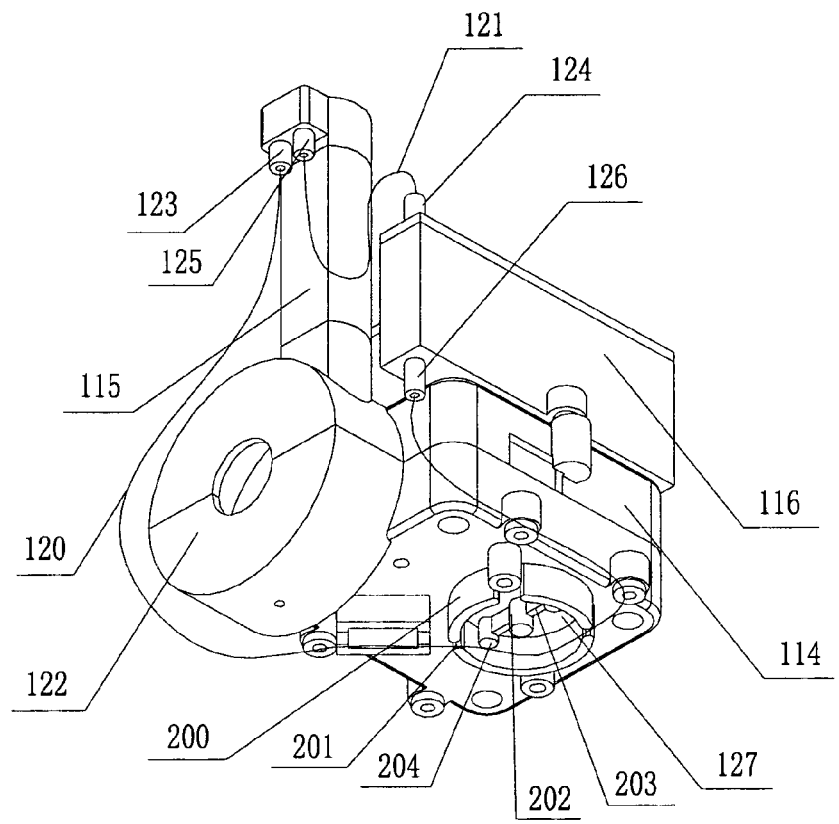
FIG. 3 is a drawing showing the assembly of the bubble-generating device in FIG. 2.
Figure 4:
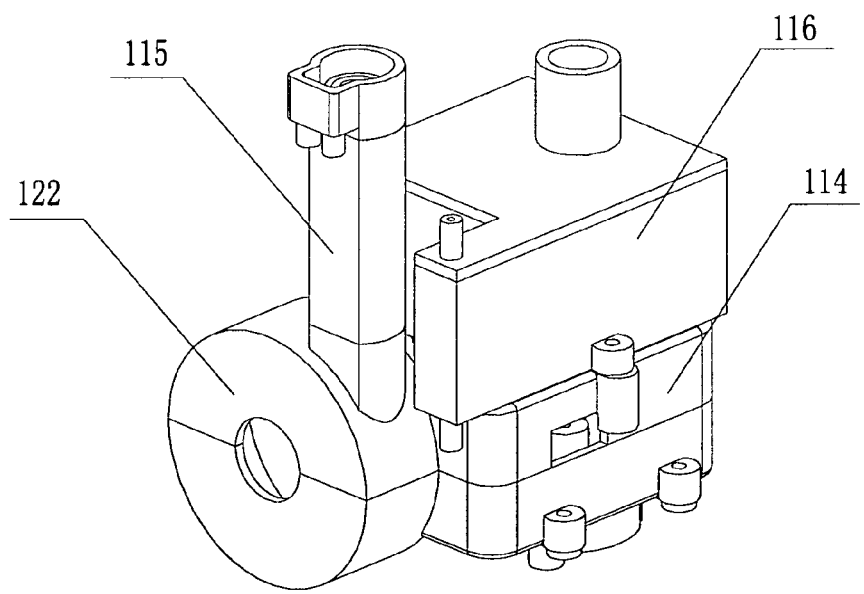
FIG. 4 is a drawing showing the assembly of the bubble-generating device in FIG. 2 in another direction (without connecting with a hose).
Figure 6:
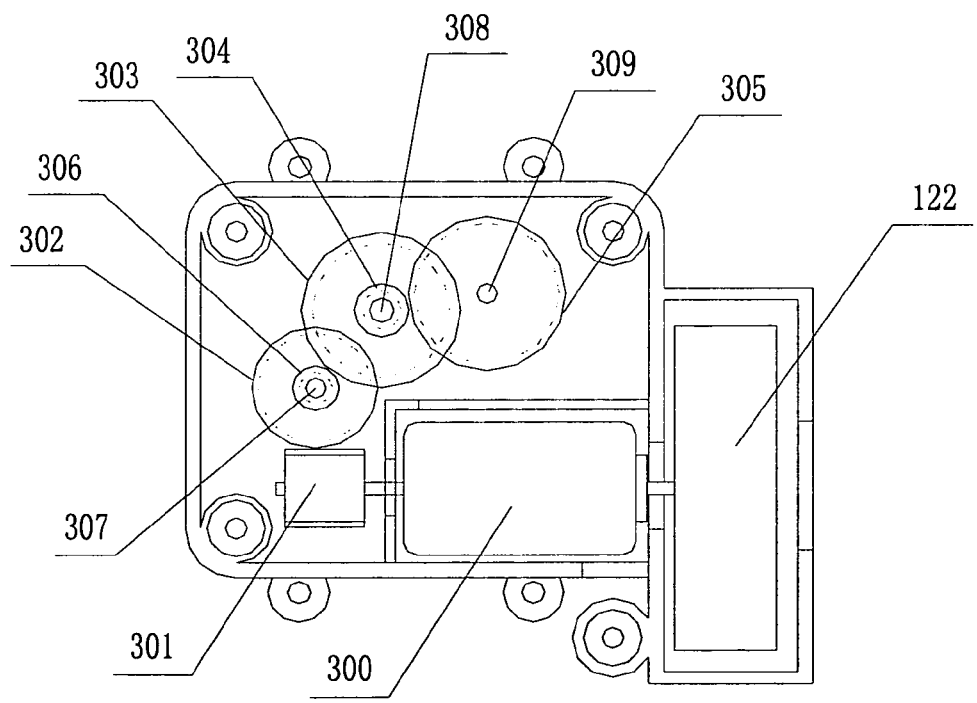
FIG. 6 is a drawing showing the structures of the transmission device in FIG. 2.

As shown in FIGS. 3 and 4, the bubble-generating device 11 comprises a bubble-ejecting barrel 115, a liquid storage tank 116, a transmission device 114, a liquid transporting device and a blower 122. As shown in FIG. 6, the transmission device 114 comprises a motor 300, a worm 301, a worm wheel 302, a first gear 303, a second gear 305, a first pinion 306, a second pinion 304, a first shaft 307, a second shaft 308 and a third shaft 309; wherein the worm 301 is connected with an output shaft of the motor 300 and the worm wheel 302 is meshed with the worm 301; wherein both the first pinion 306 and the worm wheel 302 are mounted on the first shaft 307, and the first gear 303 and the first pinion 306 are meshed with each other; wherein both the second pinion 304 and the first gear 303 are mounted on the second shaft 308; the second pinion 304 and the second gear 305 are meshed with each other; and the second gear 305 is mounted on the third shaft 309; and wherein the blower 122 is connected to another output shaft of the motor 300.

The vent port of the blower 122 is connected with the lower opening of the bubble-ejecting barrel 115. The top of the bubble-ejecting barrel 115 is provided with a liquid inlet port 123. The top surface of the liquid storage tank 116 is provided with a liquid inlet opening 124 and the bottom surface of the liquid storage tank 116 is provided with a liquid outlet opening 126. The liquid inlet port 123 of the bubble-ejecting barrel 115 is connected with the liquid outlet port 126 of the liquid storage tank 116 through a hose 120 passing through the liquid transporting device.

As shown in FIG. 3, the liquid transporting device is a liquid pump 127 which includes a cylindrical barrel 200 disposed at the bottom of the lower housing 111, wherein two openings 201 are provided at the symmetrical positions on the circumference of the barrel 200 so that the hose 120 connected between the liquid inlet port 123 of the bubble-ejecting barrel 115 and the liquid outlet port 126 of the liquid storage tank 116 passes through the two openings 201, thereby allowing a portion of the hose to be disposed inside the barrel 200. The end of the second shaft 308, passing through the lower housing of the transmission device 114, is disposed in the center of the barrel 200. A rotational arm 203 which rotates together with the second shaft 308 is fixed to the end of the second shaft 308, wherein each of the two ends of the rotational arm 203 is provided with a support shaft on which a rotational body 204 is provided, wherein the rotational body 204 periodically presses against the hose 120 inside the barrel 200 as the rotational arm 203 rotates. Hence, the objective of transporting the liquid is realized.

Figure 5:
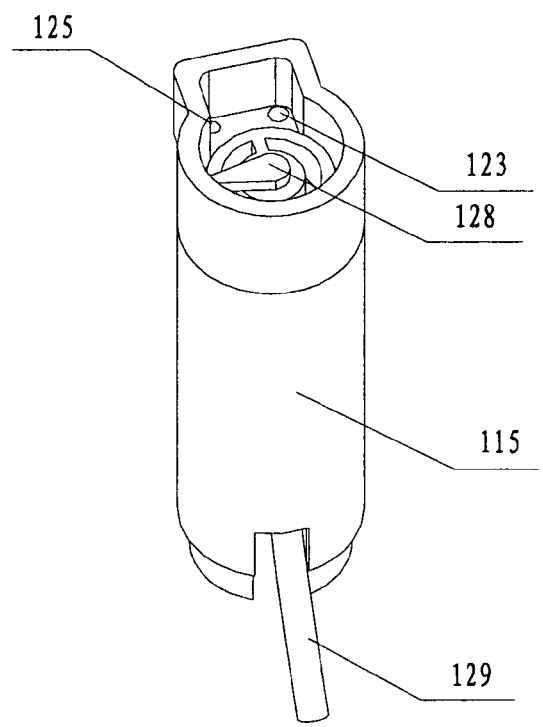
FIG. 5 is a drawing showing the structures of the bubble-ejecting barrel in FIG. 2.

As shown in FIG. 5, the bubble-ejecting barrel 115 has an upper opening and a lower opening. A liquid inlet port 123 is provided to the top of the bubble-ejecting barrel 115, wherein a film-hanging needle 128 which can rotate around the central axis of the bubble-ejecting barrel 115 is provided at the center of the upper opening, the rotational shaft of the film-hanging needle 128 being connected with a connecting pipe 129. The level of the plane in which the liquid inlet port 123 is disposed at the top of the bubble-ejecting barrel 115 is lower than the position of the film-hanging needle 128. After the liquid passes through the liquid inlet port 123 and reaches a certain quantity, it reaches the film-hanging needle 128. The rotation of the motor 300 activates the rotation of the third shaft which activates the rotation of the connecting pipe 129 and the film-hanging needle 128 sequentially. Hence, a film is formed at the vent of the bubble-ejecting barrel 115 and is converted into a bubble when blown by the blower 122.

In order to make the excessive liquid overflow the bubble-generating device, an overflow opening 125 may be provided at the top of the bubble-ejecting barrel 115, wherein the overflow opening 125 of the bubble-ejecting barrel 115 is connected with the liquid inlet opening 124 of the liquid storage tank 116 through an overflow hose 121 to prevent the excessive liquid from flowing into the inside of the bubble-ejecting barrel 115 directly. As a variation, the transmission device 114 may be any kind of the existing transmission devices having a plurality of output shafts and the liquid transporting device may be a liquid pump 127. Of course, the bubble-generating device 11 may be any other kind of the existing bubble-generating devices.

Figure 2:
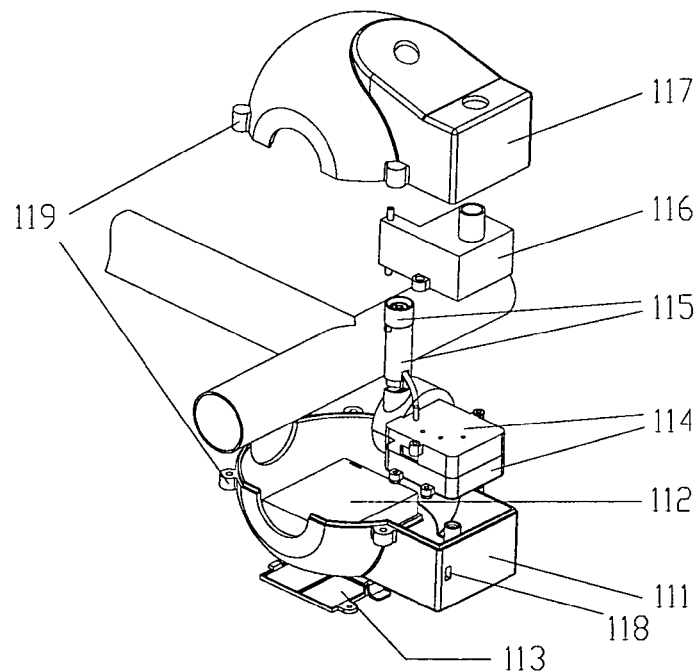
FIG. 2 is an exploded view showing the structures of the bubble-generating device and the footrest carrier.

As shown in FIG. 2, in order to fix the bubble-generating device 11 to the footrest carrier, the bubble-generating device 11 is provided with an upper housing 117 and a lower housing 111 which are provided with corresponding connecting posts 119 respectively, so that the bubble-generating device 11 is fixed to the footrest carrier with the connecting posts 119 and self-tapping screws. Thus, the mounting and dismounting of the bubble-generating device 11 is very convenient. Of course, the dismounted bubble-generating device 11 may be mounted to other scooters.

As shown in FIG. 2, the motor and the transmission device of the bubble-generating device 11 are powered by batteries. A battery box 112 is disposed inside the lower housing 111. A battery box cover 113 is disposed at the lower outer wall of the lower housing 111. And a power switch 118 is also disposed at the outer wall of the lower housing 111.

When a child rides the scooter, if he wants the bubble-generating device 11 to generate bubbles, he needs to switch on the power switch 118. Then, the motor is powered by the batteries, activating the transmission device 114, the blower 122 and the liquid pump 127. The liquid pump 127 transports the liquid inside the liquid storage tank 116 via the hose to the top of the bubble-ejecting barrel 115. The blower, driven by the rotation of the transmission device 114, produces airflow to blow the liquid at the top of the bubble-ejecting barrel 115, thereby generating bubbles. If excessive liquid flows into the bubble-ejecting barrel 115, the excessive liquid passes through the overflow hose 121 and returns to the liquid storage tank 116. Thus, a return circuit for recycling excessive liquid is formed through the hose 120 and the overflow hose 121. When a child rides the scooter, he can control the bubble-generating device 11 through the power switch 118. The bubbles generated by the bubble-generating device 11 add fun to the sport.

The above describes this utility model in detail with reference to the figures. However, it should be noted that the above is only the embodiment of this utility model. The person skilled in the art can make modifications and improvement to this utility model within the concept of this utility model. These modifications and improvement shall be deemed to fall into the protection scope of this utility model.

The invention claimed is:

1. A bubble-generating scooter for children comprising a footrest assembly, a handle assembly and wheels, characterized by further comprising a bubble-generating device mounted on the scooter,
   wherein the bubble-generating device comprises:
   a liquid storage tank having a liquid inlet provided at the top thereof and a liquid outlet provided at the bottom thereof;
   a bubble-ejecting barrel having an upper opening and a lower opening, with a liquid inlet port being provided at the top of the bubble-ejecting barrel, wherein a film-hanging needle which can rotate around the central axis of the bubble-ejecting barrel is provided at the center of the upper opening, the rotational shaft of the film-hanging needle being connected with a connecting pipe;
   a blower whose vent port is connected with the lower opening of the bubble-ejecting barrel;
   a transmission device having a plurality of output shafts;
   a liquid transporting device for transporting liquids;
   wherein the liquid inlet port of the bubble-ejecting barrel is connected with the liquid outlet of the liquid storage tank through a hose passing through the liquid transporting device; and
   the liquid transporting device, the blower and the connecting pipe which is connected to the rotational shaft of the film-hanging needle are connected to each of the output shafts of the transmission device, respectively.

2. The bubble-generating scooter for children according to claim 1, characterized in that two of the wheels are provided at the rear portion of the scooter; a footrest carrier is provided between the two wheels; and the bubble-generating device is mounted on the footrest carrier.

3. The bubble-generating scooter for children according to claim 2, characterized in that connecting posts are provided to the housing of the bubble-generating device, wherein the bubble-generating device is connected to the footrest carrier through the connecting posts and self-tapping screws.

4. The bubble-generating scooter for children according to claim 1, characterized in that an overflow opening is provided to the top of the bubble-ejecting barrel and is connected with the liquid inlet of the liquid storage tank via an overflow hose.

5. The bubble-generating scooter for children according to claim 1, characterized in that the transmission device includes a motor, a worm, a worm wheel, a first gear, a second gear, a first pinion, a second pinion, a first shaft, a second shaft and a third shaft;
   wherein the worm is connected with an output shaft of the motor, and the worm wheel is meshed with the worm;
   both the first pinion and the worm wheel are mounted on the first shaft, and the first gear and the first pinion are meshed with each other;
   both the second pinion and the first gear are mounted on the second shaft; the second pinion and the second gear are meshed with each other; and the second gear is mounted on the third shaft;
   the blower is connected to another output shaft of the motor; and
   the lower portion of the connecting pipe connected with the film-hanging needle is connected with the third shaft.

6. The bubble-generating scooter for children according to claim 1, characterized in that the liquid transporting device includes a cylindrical barrel provided at the bottom of the lower housing of the transmission device; two openings are provided at the symmetrical positions on the circumference of the barrel so that the hose connected between the liquid inlet port of the bubble-ejecting barrel and the liquid outlet of the liquid storage tank passes through the two openings, thereby allowing a portion of the hose to be disposed inside the barrel; the second shaft, passing through the lower housing of the transmission device, is disposed in the center of the barrel; a rotational arm which rotates together with the second shaft is fixed to the end of the second shaft; each of the two ends of the rotational arm is provided with a support shaft on which a rotational body is provided; and the rotational body periodically presses against the hose inside the barrel as the rotational arm rotates.

\* \* \* \* \*